Figure 1:
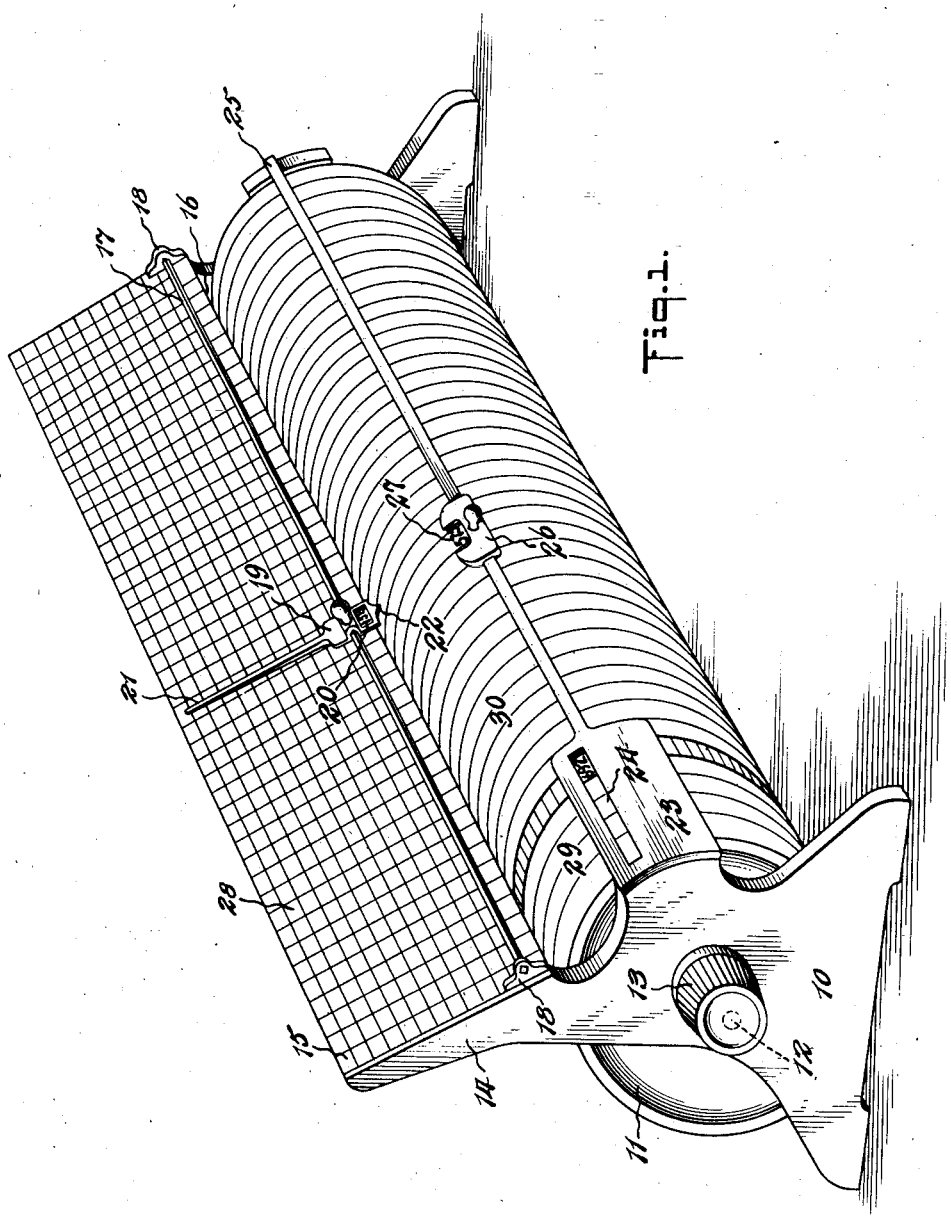

Sept. 8, 1942.　　　P. CARROLL, JR　　　2,295,497
CALCULATING DEVICE
Filed Nov. 16, 1940　　　3 Sheets-Sheet 1

INVENTOR
PHIL CARROLL JR.
BY
Orton and Griswold
ATTORNEYS

Sept. 8, 1942.    P. CARROLL, JR    2,295,497
CALCULATING DEVICE
Filed Nov. 16, 1940    3 Sheets-Sheet 2

INVENTOR
PHIL CARROLL JR.
BY
Orton and Griswold
ATTORNEYS

Sept. 8, 1942.                P. CARROLL, JR                    2,295,497
                            CALCULATING DEVICE
                          Filed Nov. 16, 1940           3 Sheets-Sheet 3

INVENTOR
PHIL CARROLL JR.
BY
Orton and Griswold
ATTORNEYS

Patented Sept. 8, 1942

2,295,497

UNITED STATES PATENT OFFICE 2,295,497

CALCULATING DEVICE

Phil Carroll, Jr., Maplewood, N. J.

Application November 16, 1940, Serial No. 365,925

19 Claims. (Cl. 235—61)

The invention relates in general to a calculating or computing device for solving formulae, involving multiplication and division with several variables, and relates specifically to a chart, or rather a combination of charts, containing series of numbers, sometimes referred to as preferred numbers, and by means of which numerical series of numbers, multiplication and division formulae may be solved quickly in an operation resembling that of a slide rule.

As is well known, the efficient use of a slide rule of the ordinary Mannheim type depends upon the skill of the operator and thus gives rise to many possible sources of error. Care must be exercised in reading the printed numbers on the slide rule scales, as certain figures are apt to be misread, as an "8" for a "3," or "18" when it should be "108," especially where the rules are old and soiled from use; particular care must be exercised in counting the sub-divisional markings and spacings, especially as the space dimensions are not equal in different parts of the cooperating scales and thus become confusing in quickly passing from one to another, and finally the last figure or digit of the scale reading is guessed more or less, as it must be obtained by interpolation.

The primary object of the invention is to provide a simple form of device for performing operations of multiplication and division and at the same time to avoid the possibility of such errors incidental to reading and interpolating slide rule scales or the equivalent.

The present invention features a device in which the actual numeral factors of the formula to be solved may be read directly as such and by means of which the answer, or at least a close approximation thereto, may be readily ascertained as a fully printed number and thus without the necessity of reading division scale markings, spaces or interpolating between spaces, as with slide rule readings.

Broadly, this invention is attained by utilizing as the important element of the device, a cheap form of attachment which may be simply a sheet of paper having printed thereon one or more charts of figures, the numerals of each chart being arranged checkerboard fashion in line and column, each column and line provided with a set of such numbers, as from 100 to 999, forming a logarithmic series, the value of any one of said numbers being ascertained from the formula $$\frac{n-1}{10}{}^{k}$$

where $n$ is the position of the number in the set or series counting from one end and $k$ is the total number of such logarithmic numbers in the series. The answer to this formula is always less than 10, and is one whole number and one or more decimal digits. In any selected case as many of the tenths, hundredths, thousandths, etc. appearing in the answer to the formula are used as is necessary to form the group of digits forming each numeral. In such a unit chart, each number in each line and column is duplicated in the next adjacent line or column, respectively shifted in offset relation by one space thus providing diagonal lines of identical numbers, and the sets forming diagonal zones of duplicated sets. With such a form of chart, any formula of the character outlined may be solved by actually or visually tracing patterns of prescribed movement on such charts determined by the proper right angled turns and which lead to the answer expressed in the actual number correct within the permissible error incidental to the particular chart then in use.

Another object of the invention is to provide a simple form of mechanism forming a calculating device or sighting instrument in which may be inserted different forms of such cardboard or paper attachments, and in which movable parts of such device will co-operate with the chart for the time being in place, for assisting the eye in its movement back and forth across the lines and up and down the columns in following the patterns of prescribed line movements and thus functioning for accurately locating in the lines and columns, those particular numbers which constitute the variables and the number constituting the final answers involved in the solution of the current formula.

Still another object of the invention is to provide a slide rule form of calculator of the parallel slide bar or rotary drum type by means of which multiplication and division may be done, in the case of the slide bars, by relative shifting of the bars and thus shifting of the series of the actual numbers involved without necessity of depending upon the use of graduated scales.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method as well as to the products produced following such method or methods.

Figure 2:
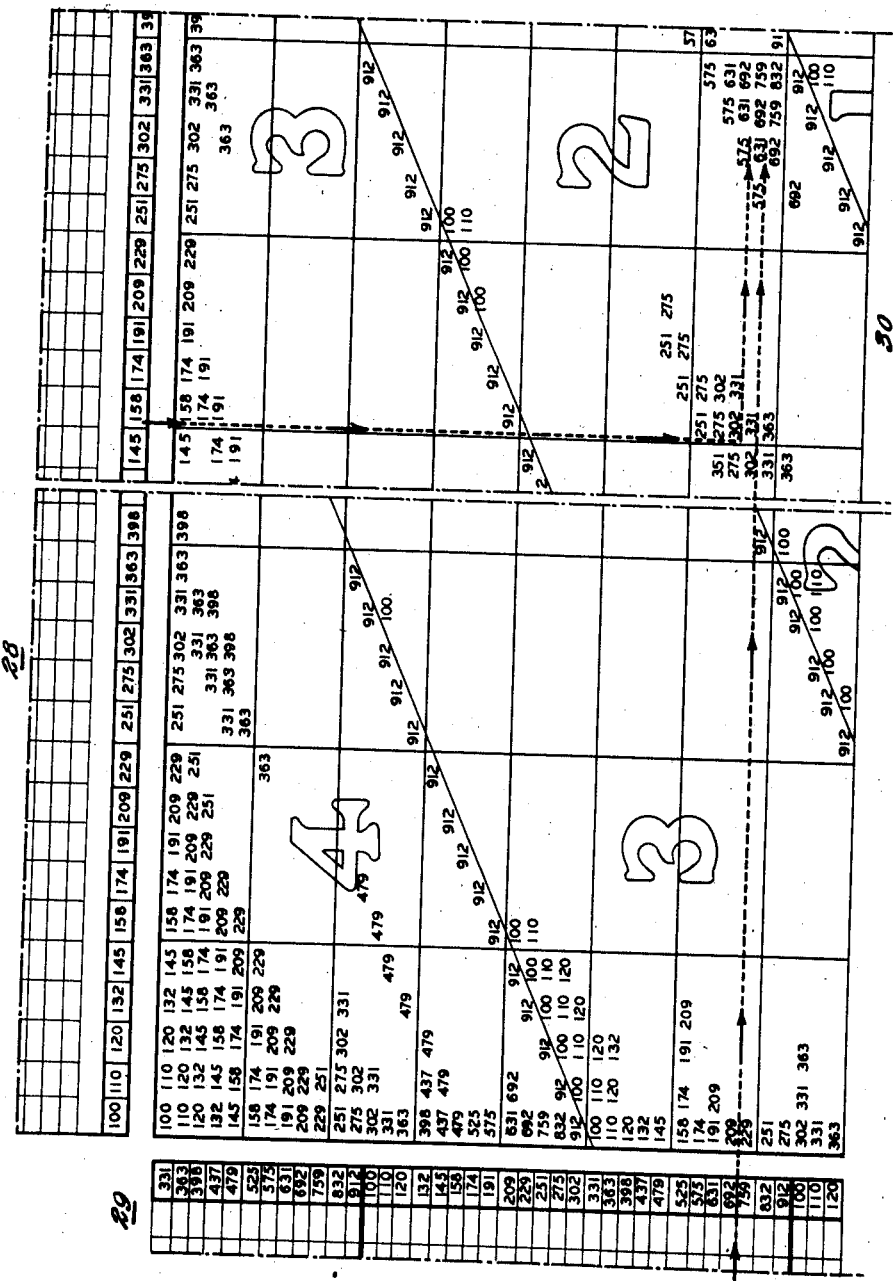

Fig. 1 is a perspective view of one embodiment of the invention equipped with one form of a replaceable attachment, and constituting one form of the novel features of this disclosure;

Fig. 2 is a plan view of one of the attachments in the form of a printed sheet adapted for use on the device of Fig. 1 when the problem to be solved involves four variables and a constant and in which form the numerals forming each series are twenty-five in number, and designated progressively between 100 and 912 of each series, and in which showing, a mid-section is broken away to save space and to get at least a part of the complete chart within the sheet;

Fig. 3 is a plan view of a different form of attachment or chart for use in solving problems of multiplication and division involving any number of variables, and where answers to problems involving divisions are found in an inverted scale of numbers located outside of the main chart and where the numerals, in this case fifty in number, designated between 100 and 955 of each series, and which chart is likewise broken away in its mid-portion;

Fig. 4 is a plan view of still another form of attachment or chart for use in solving problems of multiplication and division on the Fig. 1 form of the invention, with parts of the unit chart broken away and also showing a form of calculating device which can be custom made by assembling unit charts of the type illustrated in Figs. 2, 3 and 4; and Fig. 5 shows two relatively slidable members provided with two lines of the Fig. 3 form of chart arranged to operate as does a slide rule of the sliding bar type.

In Fig. 1 there is shown a mechanical calculating device of the cylindrical drum type equipped with a suitable form of two-part chart, one of which is illustrated in Fig. 2. The device illustrated includes a pair of upstanding end frames or standards 10, between which is snugly fitted a cylindrical drum 11 fixed to a shaft 12 journalled at opposite ends in the standards. The drum is rotated by means of knurled knobs 13 at opposite ends of the shaft. The drum is designed to receive a main and a supplemental chart, preferably printed on a single sheet of paper sufficiently flexible to be curved about the drum. The standards are provided with a pair of upstanding extensions 14 between which is fitted a rearwardly inclined and upwardly facing display board 15 secured to the extensions and adapted to receive a second, relatively fixed, supplemental chart, preferably printed on a flat sheet of paper.

Extending across the board 15 adjacent its lower edge 16 is a cross bar 17 forming a guide rod secured in place at opposite ends by brackets 18 fixed to the standards. A rider 19 is slidably mounted on bar 17 for shifting lengthwise of the lines of the associated chart and is provided with a small rectangular sight window 20 having an area equal to the block or space occupied by any one number in such chart. The rider 19 is provided with a long upstanding rod 21 overlapping the board 15 and the supplemental chart thereon and forming a column finder. Instead of using the edge of the rod 21, it may be provided with a sight window like that shown at 24. The rider is also provided with a short pointer 22 depending from the rider, extending across the edge 16 and overlapping the drum 11 to form a column pointer for the main chart on the drum. The column finder 21 and the pointed end of the pointer 22 are in the same vertical plane.

Extending across the front of the device, parallel to the axis of the drum and in advance of the same, is a line guide supported at opposite ends by the side standards 10. The guide includes a relatively wide, flat face plate 23 provided with an elongated slot 24 forming a sight window having a width, considered vertically equal to the height of a block containing one of the numerals in the chart intended to be carried by the drum 11, and having a length equal in width to that of the supplemental chart intended to pass beneath this window. In line with the lower edge of the window 24 is the upper edge of a cross bar 25 forming a straight edge and a fixed track on which is slidably mounted a line rider 26, in turn provided with a sight opening 27 of a size to fit over and frame the block occupied by any one of the numerals on the main chart carried by the drum.

It is understood that the drum of Fig. 1 is designed to operate with three charts, but it is within the scope of the disclosure to omit any fixed supplemental chart from the display board 15. It is also possible to omit the rotative supplemental chart from the end zone of the drum beneath the face plate 23 and to utilize the drum simply with a single main work chart thereon and to utilize the two riders in connection with such a main chart as hereinafter described and as suggested when the Fig. 3 form of attachment is used.

As to what particular form of chart is used in any specific case will depend upon the type of problem to be solved and several illustrative examples will be discussed.

Suppose it was desired to compute machining times, involving say, four variables, to wit: length, diameter, feed and surface speed and a constant.

For illustration, suppose the formula to be solved is:

$$.321 \times \frac{\text{length} \times \text{diameter}}{\text{feed} \times \text{surface speed}}$$

where .321 is a known constant used in this particular problem. For example, suppose Length= 3.02
Diameter= 6.31
Feed=15.8
Surface speed=69.2

This problem can be solved by selecting an attachment such as is shown in Fig. 2 and locating the same properly on the Fig. 1 device. This attachment is originally provided as a single sheet with three charts thereon arranged in an L-shaped form and, when separated for use on the Fig. 1 device, is divided into two parts, a part forming a horizontal supplemental chart 28 temporarily secured as by pasting or by suitable thumb-tacks or clips to the display board 15 and the other part forming a drum covering and including a supplemental chart 29 located beneath the face plate 23, and a main chart 30 pasted or secured by clips to the part of the drum 11 overlapped by the cross bar 25.

Referring first to the main chart 30, a broken-off part of which is shown in Fig. 2, there is disclosed in checkerboard fashion a plurality of repeating sets or series of numerals arranged in line and column. In this example, the chart is prepared with twenty-five numbers in each set or series beginning with 100 in the upper left hand corner and proceeding both downwardly and to the right progressing to 912, and which sets then repeat themselves to any desired extent of the problem to be solved for which the device is designed within the length and circumferential limitations of the drum 11.

These numbers are in effect a specialized form of logarithm; are selected, insofar as their total number is concerned, to minimize the total present in any logarithmic range as between 100 and 999, and each numeral in this showing is approximately a ten percent increment over the preceding numeral. Any one of these numbers can be obtained from the formula $$10^{\frac{n-1}{k}}$$

as above described, and is correct to within five percent, or, differently expressed, the maximum error is within five percent.

For example, take the fourth number in the series of twenty-five which appears on the chart. Applying the formula:

$$x = 10^{\frac{4-1}{25}} = 10^{\frac{3}{25}} = 10^{.12} = 1.318$$

The chart shows the nearest whole number 132.

Each of the numerals forming the second vertical column is spaced upwardly one step from the identical number of the first column and progressively across the chart each numeral is stepped up one space higher than that number in the preceding column. For instance, 145 being the fifth number in the first column becomes the fourth, third, second and first number in each succeeding column moving to the right.

Similarly, the numerals forming the second horizontal line are spaced to the left one step from the identical numeral of the first line and progressively down the chart each numeral is stepped to the left one space further than that number in the next preceding line thereabove. For instance, 120 being the third number in the first line becomes the second and then the third number in the next column towards the left.

This has the effect, of course, of arranging identical numerals on diagonal lines, inclined upwardly to the right, as illustrated in connection with the 912's and the 100's.

There are also marked on the chart diagonal lines separating the highest number (912) of each line and column from the next adjacent lowest number (100) below the line. These parallel diagonal lines form therebetween wide diagonal zones, duplicated one after the other down the sheet and towards the right. Preferably, there are four or five such zones on the usual charts depending upon the number of decimal places which may be desired to be used in the factors of the formula and required in the resulting answer. It is suggested that these zones be progressively numbered upwardly 0, 1, 2, 3, 4, etc., as indicated in the large ghost characters, to indicate where the decimal point should be located in the factors and answer. In other words, when moving towards any definite number, as hereinafter illustrated, the number is selected in that ghost numbered zone which indicates the number of digits in the number back of the decimal point of the number desired.

For instance, suppose one of the factors in the problem to be solved is 112, ignoring decimals, the nearest numeral on the chart is 110 and this must be used. Considering factors using decimals, suppose the factor were 0.0112, involving four digits after the decimal point, then the 110 in zone 4 is used; if 0.112 with three digits after the decimal point, then the 110 in zone 3 is used; if 1.12, then the 110 in zone 2 is used; if 11.2, then the 110 in zone 1 is used; if 112, then the 110 in zone 0 is used, because there are no decimals involved. It is also suggested that zones be printed with different type, or in different colors, or have some other notice impelling, distinctive characteristics to render each of the zones noticeably distinctive from the next adjacent zone or zones.

The supplemental chart 29 is formed at the left side of the main chart and in the instant case discloses a single column of numerals identical with those in every other column in the associated main chart 30 but with the column shifted longitudinally to bring 331, being the nearest number to correct constant .321, in line with the first or top line of the main chart.

It is within the scope of the disclosure to provide supplemental chart 29 with columns of figures representing known factors in the problem to be solved; involving, say, surface feet per minute in connection with, say, bronze, copper, steel and the like. It is suggested that these be pasted or otherwise temporarily affixed to the face plate 23, indicating words like "bronze," "copper," "steel" etc., or symbols to designate the columns of these factors as they pass the window 24.

The supplemental chart 28 is formed of a locating line of numerals identical with those of the first line in the main chart and in respectively vertical alignment therewith, that is, in this case, the 100 of the main chart is directly below the 100 of the supplemental chart 28.

As was the case with chart 29, the upper portion of chart 28 may likewise be provided with columns of figures representing known factors in the problem to be solved, say feed in thousandths per revolution and any one of which may be picked up by the column finder 21 and its location transferred to the main chart by the pointer 22.

The attachment forming the Fig. 2 disclosure is located on the Fig. 1 device, care being exercised to locate the charts 29 and 30 on the drum to cause chart 29 to rotate past the opening 24; and each column on the main chart to rotate respectively in the planes defined by the same numerals on the fixed supplemental chart 28.

Reverting now to the suggested problem as an illustration of the operations of the device, the drum is rotated until the required surface speed (69.2) on the chart 29 shows in the slot 24, and at this point in its rotation the drum is stopped. The rider 26 is then shifted until the diameter (6.31) reading as the whole number 631 appears in the opening 27. The particular 631 selected at this time is that one in the zone 2 group because 6.31 has two digits after the decimal point.

The rider 19 is now moved along the supplemental chart 28 until the proper feed (15.8) then indicated as 158 appears in its window 20. The drum is then rotated until the correct length (3.02) appears in the column indicated by the pointer 22 and the drum rotation is stopped when the length (3.02) is located immediately above the straight edge provided by the cross bar 25. The 302 selected in this column was the 302 in zone 2 because 3.02 has two digits after the decimal point. The answer (575) will then appear in the opening 27 and as this is in the zone 2, it will indicate that the proper answer is 5.75.

This same result may be obtained by the use of a right angled straight edge tracing a pencil line on the charts when laid flat as indicated.

The same result may be obtained by the use of two carpenter's squares. In practicing this method as shown by the heavy dotted lines in Fig. 2, lay a carpenter's square so as to intersect the selected surface speed (692) on the chart 29, with the right angled point of the square placed upon the selected diameter (631) in line therewith in the main chart. At this point it cannot be predicted whether the other arm of the square will extend upwardly or downwardly. Place an edge of the other square through the feed selected (158) in the chart 28, and its point at the right angle placed upon the selected length (302). When the two other arms of the squares are extended in those directions to cause them to intersect, then the answer (575) will be at the intersection of these two remaining arms. As indicated above, the proper location of the decimal point in the answer will depend upon the numbers selected during the operation from the proper zones.

While chart 29 shows the column of numerals shifted upwardly to bring 331 in registry with the first line of the main chart, it is understood that charts 28 and 29 may comprise a duplication of the unit blocks of the main chart and in this way that column or line may be used whose first number corresponds to the constant of the formula. It was for the purpose of quickly locating the desired factor in the appropriate column that the column finder 21 was suggested as useful.

In order to show how the device may be used where steps of division are involved in the formula, another form of chart 31, as disclosed in Fig. 3, may be utilized as the main chart on the drum.

The chart 31 is larger than the chart 30, that is, contains more numerals per unit block than in the Fig. 2 form. In this case there are fifty numerals to each line and column of the unit block of which the complete chart is formed, each series commencing with 100 in an upper left hand corner of any unit square of a series, and progressing as 105, 110, 115, 120, 126, 132 etc. and terminating with 955 beyond which the series is repeated in both line and column for as many times as desired to form the succeeding unit squares. The numbers are obtained as above described using the formula $$10^{\frac{n-1}{k}}$$

For instance, take the sixth number (that is, 126) of the series which comprise fifty numbers and applying the formula, $$x = 10^{\frac{6-1}{50}} = 10^{\frac{5}{50}} = 10^{.1} = 1.2559$$

Take the ninth number in this series (that is, 145) and applying the formula, $$x = 10^{\frac{9-1}{50}} = 10^{\frac{8}{50}} = 10^{.16} = 1.445$$

In this case, there is provided a bottom horizontal line composed of an inverted set of these same numerals, that is, 955, at the bottom of the first column of the major chart, has just therebelow the numeral 100 in the inverted bottom line. The progressively increasing numerals 100, 105, 110, 115, 120, 126, 132, 138 and so on, reading from left to right of the bottom line are each immediately above the progressively decreasing numbers 955, 912, 871, 832, 794, 759, 724, 661 and so on, reading left to right of the inverted line.

Suppose that the formula to be solved is:

$$\frac{631}{832} \times 525 \times \frac{1}{794} \times 398 \times \frac{1}{251}$$

With the chart as arranged in Fig. 3, the division must precede multiplication.

In this case, the main chart is entered at 631 of the first column of the basic chart within the heavy boundary lines and either a line is actually drawn to 832 or the equivalent operation is had by means of the Fig. 1 device, that is, the drum 11 is rotated until 631 comes in line with the straight edge provided by the cross bar 25; the rider 26 shifted until 832 comes into the opening 27 and then the drum is rotated until the reversed line at the bottom comes in alignment with the straight edge and the answer appears in the opening 27. The first step being an act of division $$\left(\frac{631}{832}\right)$$

the answer (759) is found at the bottom of the column in the inverted line.

The problem then becomes one of multiplication, 759×525. From 759 in the 7th column of the series, move up to 525 and the answer 398 is found in line therewith in the first column of the main chart.

The problem then becomes one of division:

$$\frac{398}{794}$$

Move in horizontally along the 398 line to 794, which will be in the sixteenth column, and the answer 501 is found at the bottom of this column in the inverted scale.

The problem then becomes a multiplication movement: 501×398. Move up the 16th column from 501 to 398 and the answer, 200, is again found in line therewith in the first column. The problem then becomes another division movement:

$$200 \times \frac{1}{251} \text{ or } \frac{200}{251}$$

Move in from the 200 line to 251 in the 6th column and the final answer 794 is found at the bottom of this 6th column in the inverted scale.

From this example it will be noted that in multiplying enter the main chart from the adjacent edges at the point marked with the nearest whole number to the multiplicand and multiplier, and the quotient will be found at the intersection of these lines in the body of the chart.

In performing division, enter the chart at the point of the numeral nearest the dividend of the problem and proceed to the number nearest that of the divisor and the answer will be found in line therewith in the inverted scale.

For the purpose of showing still another and more accurate form of chart, capable of being used as herein suggested for the charts forming Figs. 2 and 3, and also capable of being used flat to solve problems in multiplication and division, reference is made to the assembly shown in Fig. 4.

It is also possible to perform operations of either multiplication and/or division by utilizing two members, each provided with duplicates of a series of numbers such as above described and sliding these members relative to each other in slide rule fashion.

In this form of calculating device, there is disclosed the four corner portions of a basic card or sheet 32 (the portions therebetween being omitted to save space) adapted to be pasted on a table or sheet of carrying paper, or otherwise attached to a duplicate thereof indicated at 33 in fabricating the device to meet the needs of solving some particular problem involving the selected number of such basic or unit cards and which number of basic cards is dependent upon the number of whole and decimal digits involved in the current problem.

Each card 32, 33 etc. is identical with every other card used in forming the assembly so that the detailed description of one will be that of every other such card. In this case, the number of numerals used is one hundred and each numeral is made up of four digits, of which the lowest is 1000 and the highest 9772. Any one of the numerals can be obtained from the above discussed formula:

$$10^{\frac{n-1}{k}}$$

For instance, to find the fifth numeral of the series, $$10^{\frac{5-1}{100}} = 10^{\frac{4}{100}} = 10^{.04} = 1.096$$

Now let it be assumed that chart 32 is to represent whole numbers and that the problem now to be solved involves a tenths figure to the right of the decimal point; then an identical chart 33 is located to the right of chart 32 with the indicator, in this case 1000, in line with the 1000 on chart 32, as indicated in Fig. 4 and so on, an additional basic chart being added on to the right of the assembly, one for each additional place beyond the decimal point. It is the intent of this showing that unit cards or sheets be printed up cheaply, so that they can be thrown away after one or two uses or when they become soiled, and which cards can be cut away if desired in those parts not used to solve the current problems. It is most convenient for the operator, in laying out an assembly of such cards, to use the least number of cards necessary to solve the current problem and in this way restrict the space necessary to form the requisite assembly. In other words, by a proper selection of basic charts, or better, only the necessary parts thereof, a composite sheet or attachment may be made up to suit the current set of problems to be solved thereby.

In Fig. 5 there are disclosed two elongated bars 34 and 35, each provided with a line of identical numbers, constituting at least one series of numbers of the type described, in this particular case there being fifty of such numbers in each series, starting with 100 and progressing logarithmically as above described up to 955, and are then repeated. This device operates as does the Mannheim slide rule, in that one of the numbers is shifted until the base figures, on one, that is, the "100" comes opposite the multiplicand on the other bar and then the answer is read on said other bar opposite the multiplier on the first named bar.

For example, suppose it be desired to find the product of 105 x 158. Shift bar 35 to the right until 100 on bar 35 is opposite the 105 on bar 34. Then on bar 35 locate the 158 and the answer, 166, will be found on bar 34 opposite 158. The actual answer is 16,590.

Suppose the problem is one of division, as for example:

$$\frac{132}{126}$$

Shift the bars relative to each other until 132 on bar 34 registers with 126 on bar 35, which happens to be the arrangement shown in Fig. 5 and the answer "105" on slide rule 34 is found opposite the 100 on slide 35. The correct answer is 1.047.

These scales may be repeated with ghost letters or colored faces so that correct decimal locations in numbers and answers may be accurately located as above described for the Fig. 2 showing. For example, suppose the full scales shown in the middle of Fig. 5, from 100 to 955 be printed in black type and assumed to mean that they represent figures with two digits after the decimal point, for instance 126 in this portion of the scale is 1.26. The scale to the left of the full scale, of which 912 and 955 are shown may be in some other color, say red, and will represent figures with three digits after the decimal, for instance, 955, in this portion of the scale is 0.955. Likewise the scale to the right of the full scale, of which 105 and 110 are shown will be in still a third color, say blue, and will represent figures with one digit after the decimal point, for instance 105 in this portion of the scale is 10.5.

In the above example where 105 was multiplied by 158 using the black mid-portion, illustrated the actual figures would be 1.05×1.58 and the answer would be 1.66; that is with the decimal point located in the three digit number at such place as will place two digits beyond the decimal point. In order to show how this slide rule operates with other decimals and numerals, suppose the problem is:

$$0.955 \times 10.5$$

Place the black indicator (100) of the scale of bar 34 opposite the red 0.955 at the left of Fig. 5. Then on bar 34 locate the blue 10.5 at the right of Fig. 5 and the answer 10.0 if found below 105 on slide 35. As this answer is found in the blue figures to the right of Fig. 5, it indicates that there is only one digit following the decimal point in the answer. So with the decimal point so located, the correct answer is 10.0.

By means of any of the forms of the invention above disclosed, it is possible to make up charts for solving special problems by using actual numbers rather than the combination of numbers, division lines, spaces and the like, characterizing known forms of slide rules and similar calculating devices which depend upon logarithmic spaces. In making up any such chart only those numbers need be made up which are necessary for use in the solving of the particular problem at hand and, in any case, only that number of digits need be used as the problem requires. In Figs. 2, 3 and 5, three digit figures were used, while in Fig. 4, four digit figures were used, but by following the suggested formula:

$$x = 10^{\frac{n-1}{k}}$$

the answer carried out to any desired number of decimal places may be used. Of course, the more numerals there are used in any one series, for instance, between 10000 and 99999 there may be used a thousand numerals in each series, the more accurate will be the several numerals selected to form a series.

Simply by adding basic charts one after the other to any desired length as suggested in the slide rule form of Fig. 5 or by adding to a table or other support units to form the multiple unit assembly suggested in Fig. 4, any problem in multiplication and division may be performed and the answer read with the correct location of its decimal point.

While in the charts illustrated, the progressive increase in values is from left to right in the case of the lines and from top to bottom in the case of the numerals forming the column, it is understood that the arrangement in both cases may be reversed; that is, in each unit chart the values may progressively decrease reading from left to right of the lines and from top to bottom of the columns, or any variation thereof. At the bottom of Fig. 3 is illustrated a line of values in reverse order from the line next above.

It is a feature of this disclosure that the answer, with the decimal point properly located and with the answer accurate to the extent provided by the particular chart then in use, can be read directly as a clearly printed numeral without the necessity of reading and interpolating the usual slide rule indications.

If any of the printed charts become marked up in use as suggested when using carpenter's squares to form pencilled guide lines thereon, or when soiled or mutilated in use, the damaged portion may be simply removed from the balance of the assembly and a fresh card or sheet substituted for the soiled card or sheet.

I claim:

1. In a device of the class described, the combination of a member having depicted thereon a plurality of numbers arranged checkerboard fashion in lines and columns and forming three rectangular charts comprising a main chart and two auxiliary charts, the auxiliary charts forming continuations respectively of two adjacent sides of the main chart, said numbers arranged with the columns of one of the auxiliary charts in alignment with the columns of the main chart and with the lines of the other auxiliary chart in alignment with the lines of the main chart, the numbers in each line and column of said charts being arranged in repeating sets, and the numbers in each line and column of each set being arranged in a logarithmic progression and identical in each line and column of every other set, a column indicating rider including a pointer extending lengthwise of the columns of one of the auxiliary charts and guided for movement parallel to the lines of the charts to indicate selectively a column of the main chart, and a straight track overlapping the main chart, extending parallel to its lines and said track and main chart being operatively correlated to have relative movement in a direction lengthwise of the columns on the main chart and said track provided with a rider selectively shiftable lengthwise thereon across the main chart to locate the number in the column indicated by the first named rider at the intersection of said column with the line for the time being at the track.

2. A device for solving formula involving multiplication and division, including a cylindrical drum mounted for rotary movement about its axis and having depicted on its cylindrical face a plurality of numbers arranged checkerboard fashion in line and column with the lines parallel to said axis and each column contained in a plane perpendicular to said axis, each line and column comprising a repeating series of identical numbers, the numbers forming each series being in logarithmic progression, a fixed track extending across said cylindrical face parallel to the lines in position to locate any desired line at the track by the rotation of the cylinder into a definite position to attain such locating of line and track, a rider guided along the track to locate any desired column, said track and rider thus coacting to locate in space any desired number on the cylinder at the intersection for the time being of the track and rider, and said cylinder adapted to be subsequently rotated into some other definite position to bring another line at the track without disturbing the previous location thereon of the rider.

3. In a device for calculating functions with several variables, the combination of a member having depicted thereon certain whole numbers arranged in checkerboard fashion in line and column, each column and line provided with a repeating set of such numbers forming a logarithmic series, the value of any one of said numbers being a whole digit and at least one decimal digit ascertained from the formula:

$$10^{\frac{n-1}{k}}$$

where $n$ is the position in the series of the desired number counting from one end and $k$ is the total number of such logarithmic numbers in the repeating series, each number in each line and column being duplicated in the next line or column respectively in offset relation by one space thereby to form on said member diagonal lines of identical numbers and said member also having depicted thereon diagonal straight lines separating the sets from each other and forming diagonal zones therebetween for indicating the location of the decimal point in the factors and answer calculated by the operation of the device, each zone visually contrasting with the next adjacent zone.

4. In a device for calculating functions with several variables, the combination of a member having depicted thereon certain whole numbers arranged in checkerboard fashion in line and column, each column and line provided with a repeating set of such numbers forming a logarithmic series, the value of any one of said numbers being approximately the number ascertained from the formula:

$$10^{\frac{n-1}{k}}$$

where $n$ is the position in the series of the desired number counting from one end and $k$ is the total number of such logarithmic numbers in the repeating series, each number in each line and column being duplicated in the next line or column respectively in offset relation by one space thereby to form on said member diagonal lines of identical numbers and said member also having depicted thereon diagonal straight lines separating the sets from each other and forming diagonal zones therebetween for indicating the location of the decimal point in the factor and answer calculated by the operation of the device, each zone visually contrasting with the next adjacent zone, each of said diagonal zones including a notice impelling distinctive characteristics not included in the next adjacent zone and functioning to render the said zone noticeably distinctive visually from the next adjacent zone.

5. A direct reading device for solving formulae involving numerical factors of multiplication and division, the combination of a member provided with a plurality of numbers arranged checkerboard fashion into more than two parallel columns and more than two parallel lines, the numbers in each column and in each line being in repeating logarithmic series with the series in each line offset longitudinally one space from the series in the next adjacent line and the series in each column offset longitudinally one space from the series in the next adjacent column, the value of any member in a series being a whole number less than ten and at least the highest tenths digit ascertained from the formula:

$$x = 10^{\frac{n-1}{k}}$$

where $x$ is the desired number, $n$ the position in the series of the desired number counting from one end and $k$ is the total number of such logarithmic numbers in the repeating series, a column indicator movable selectively in either direction parallel to said lines to indicate the column containing the number nearest one of said factors, a track extending parallel to the lines and shiftable at right angles to its length across said member and adapted to be located at that line which contains the number nearest to another of said factors and a rider slidably mounted on said track to locate that number which forms the intersection of the column indicated by the column indicator and the line indicated by the track.

6. In a device for calculating functions with several variables including a member having depicted thereon a plurality of idential sets of numbers with the numbers of each set arranged checkerboard fashion in intersecting lines and columns to form a chart, the numbers in each set being repeated in both line and column in the next adjacent set, said numbers of each set increasing in logarithmic progression, each number of every line or column being one space removed from the corresponding number in the next adjacent line and column respectively and a pair of indicating elements, one carried by the other, one movable relative to the chart for selective alignment with the lines and the other element movable relative to the chart for selective alignment with the columns whereby one of the elements may be located on the chart at the line containing the number most nearly indicating one of said variables and the other element may be located on the chart at the column containing the number most nearly indicating another of the variables.

7. In a device for calculating functions with several numerical variables, including two relatively movable parts operatively associated to have a slide rule relation and coacting to solve problems in multiplication and division, both of said parts having thereon a line of idential numbers equidistantly spaced apart and forming a logarithmic series, any one of said numbers being the answer to the formula $$10^{\frac{n-1}{k}}$$

carried out to a desired number of decimal places and in which formula $n$ is the position of the number in the series and $k$ is the total number of such logarithmic numbers in the series.

8. In a device for solving formulae involving numerical factors of multiplication and division, a replaceable element provided with means for locating it in place in the device and said element having depicted on one side thereof a line of whole numbers comprising a repeating series of logarithmic numbers, each number of the series being approximately the answer to the formula $$10^{\frac{n-1}{k}}$$

where $n$ is the position of the number in the series counting from one end and $k$ is the total number of such logarithmic numbers in the series.

9. A device for use as a slide rule operates, comprising two relatively movable members each having depicted thereon a line of identical numerals arranged in logarithmic progression and equidistantly spaced apart, said members adapted to be arranged with the lines in parallel offset relation in position to be shifted longitudinally relatively to each other to solve problems involving multiplication and division.

10. The combination of two relatively movable members fashioned to be operated as is a slide rule, each of said members provided with a line of numbers forming a repeating series with the members of each series ranging in logarithmic progression from 100 to 999, each number being ascertained from the formula $$x = 10^{\frac{n-1}{k}}$$

carried out to any desired decimal places and where $n$ is the position in the series of the desired number counting from one end, and $k$ is the total number of such numbers in the series.

11. A unit for use in an assembly of such units constituting a calculating device, said unit having depicted thereon a chart of natural numbers arranged unilaterally in a numerical progressive order of which the lowest, at one end of the line formed by said numbers, has the number "1" as its left digit and all other digits thereof being "0," each number being confined in a rectanular space of the same size whereby the aggregate length of any number of such spaces will always be the same anywhere along the line, and means including said lowest number constituting an indicator for locating the unit as a whole in proper spaced relation to the highest number of the next preceding similar unit.

12. A calculating device comprising a support and a plurality of unit devices assembled on said support, each of said devices having depicted thereon a rectangular chart of numerals arranged in checkerboard fashion in line and column, each numeral occupying a rectangular space equal to that occupied by every other numeral, each line and column containing an identical series of numerals of which the lowest value has the figure "1" for its left digit and all other digits having the figure "0," and the other numerals in each series having the same number of digits as the one of lowest value and progressing in order to a number of maximum value, the numerals in each succeeding column considered from left to right and being offset upwardly one space from the corresponding numeral in the next column to the left thereof, and the numerals in each succeeding line considered from top to bottom being offset to the left one space from the corresponding numeral in the next line above, and said device being assembled, arranged and temporarily secured to the support to provide repeating series of such numerals in at least one direction across the device, with the numeral of lowest value of each succeeding unit device located next adjacent the numeral of highest value of the next preceding unit and spaced equidistantly relative thereto to maintain the continuity of spacing of the numerals across the junction of any two succeeding units.

13. An assembly of identically printed units for use in solving problems of multiplication and division involving decimals, each of said units having depicted thereon a series of numerals of progressively increasing values, of which the numeral of lowest value has "1" for its left digit and has all other digits thereof zeros, and in which all numerals have the same number of digits as does said numeral of lowest value, each of said numerals occupying a rectangular space of the same size as that occupied by every other numeral, each series being identical in the numerals used, in their sequential arrangement and in their space disposition as those forming every other series, and said units being assembled relative to each other to provide a repeating series of such numerals and in which any pair of identical numbers taken from adjacent units is spaced apart the same distance as any other pair of identical numbers taken from adjacent units.

14. A device for use in solving problems of multiplication and division including an element having depicted thereon a plurality of numerals arranged in a plurality of columns and lines, and each line and column forming a series of progressive numerals, with the numerals in each column being equidistantly spaced apart and with the numerals in each line being equidistantly spaced apart to provide a checkerboard arrangement, each line and each column including at least one series of such numerals, each series being identical with every other series, and the numerals of each series containing the same number of digits, the numeral of lowest value having "1" for its left digit and all other of its digits being zeros, the value of any number in the series being the number ascertained from the formula $$10^{\frac{n-1}{k}}$$

carried out to that decimal place which is one less than said number of digits in said numerals, and in which formula $n$ is the numerical location of the desired number in the series counting from said numeral of lowest value and where $k$ is the total number of numerals in the series, each numeral of each succeeding column being shifted vertically one space from the identical numeral in the next preceding column to the left and each numeral of each succeeding line being shifted horizontally one space from the identical numeral in the line next above, and thus to bring identical numerals in a diagonal line, and said numeral of lowest value forming an indicator for locating the device relative to other devices identical with said device, and a coacting element operatively associated therewith for tracing prescribed patterns thereon.

15. A device for use in solving problems of multiplication and division, including means having depicted thereon a plurality of numerals arranged to form a main chart and another chart, the numerals forming the main chart arranged in a plurality of columns and lines and each line and column forming a series of progressive numerals, with the numerals in each column being equidistantly spaced apart and with the numerals in each line being equidistantly spaced apart to provide a checkerboard arrangement, each line and each column including at least one series of such numerals, each series being identical with every other series, and the numerals of each series containing the same number of digits, the numeral of lowest value having "1" for its left digit and all other of its digits being zeros, the value of any number in the series being substantially the answer ascertained from the formula $$10^{\frac{n-1}{k}}$$

where $n$ is the numerical location of the desired number in the series counting from said numeral of lowest value and where $k$ is the total number of numerals in the series, each numeral of each succeeding column being shifted vertically one space from the identical numeral in the next preceding column to the left and each numeral of each succeeding line being shifted horizontally one space from the identical numeral in the line next above, and thus to bring identical numerals in a diagonal line, and said other chart having depicted thereon at least one of said series of such numerals, the numerals of said other chart being arranged in inverse order relative to the order of arrangement of the numerals in the main chart with the numeral of highest value in the inverted series located opposite the numeral of lowest value in the next adjacent series parallel thereto in the main chart.

16. A calculating device for solving problems of division, having depicted thereon two parallel and identical series of numerals, each numeral thereof having the same number of digits, the value of the numeral of least value having "1" as its left digit and all the other digits being zeros, the value of any selected numeral in the series being ascertained from the formula $$10^{\frac{n-1}{k}}$$

carried out to that number of decimal places which is one less than the number of digits in the numerals and in which formula $n$ is the number indicating the position of the desired numeral in the series counting from said numeral of lowest value and where $k$ is the total number of numerals in the series, the numerals in the two series being in relatively inverse order, that is, the values in one series increase in one direction while the values in the other series decrease when read in said direction.

17. A device for use in solving problems of multiplication and division, having depicted thereon a plurality of numerals all having the same number of digits of progressively increasing value and forming a series of numerals, the numeral of lowest value having a "1" for its left digit and all other digits of which are zeros, any selected numeral in the series being obtained from solving the formula $$10^{\frac{n-1}{k}}$$

carries out to that decimal place which is one less than said number of digits in each of the numerals, in which formula $n$ is the number in the series of the selected numeral counting from said numeral of lowest value and $k$ is the total number of numerals in the series.

18. In a direct reading device for solving formula involving multiplication and division, the combination of a cylinder mounted for rotary movement about its own axis and having depicted thereon a plurality of numbers arranged fixedly in checkerboard fashion in lines and columns and forming a main chart and an auxiliary chart at all times in permanently fixed relation, the auxiliary chart forming a continuation of a side of the main chart, said numbers arranged with the lines of the auxiliary chart in alignment with the lines of the main chart and with its columns in planes parallel to the column of the main chart, the numbers in each line and column of said charts being arranged in repeating sets, the numbers in each line and column of each set being arranged in a logarithmic progression and the set of numbers in each line and column being identical with the set of numbers in each succeeding line and column, the numbers in each column being equidistantly spaced apart and the numbers in each line being equidistantly spaced apart, a column indicating rider guided for movement parallel to the lines of the charts to indicate selectively a column of the main chart and a straight, fixed track overlapping the main and supplemental charts, extending parallel to their lines and provided with a rider selectively shiftable lengthwise thereon across the main chart to indicate the location of the number in the column indicated by the rider at the intersection of said column with the line for the time being in line with the track.

19. In a device of the class described, the combination of a frame, a single drum mounted on the frame for free rotary movement about its own axis, a display board fixed to the frame and extending lengthwise of the drum and offset from its axis, said board and drum each provided with figures arranged in lines parallel to said axis and in intersecting columns in parallel planes perpendicular to said axis, the columns on the display board being in alignment with the columns on the drum, the figures on the drum forming at one end thereof a main chart and at the other end thereof a supplemental chart, a cross bar fixed to the display board and extending parallel to the lines thereon, a rider slidable on the cross bar having a column finder extending at any instant of time along a column on the display board and with a pointer coacting with the columns on the drum, a face plate carried by the frame and provided with a slot extending parallel to and overlapping the supplemental chart and a cross bar fixed to the frame, extending parallel to the lines on the main chart and provided with a line rider having a sight opening for framing any of the numbers on the main chart.

PHIL CARROLL, JR.